(No Model.)　　　　　　　　　　　　　　　　　　2 Sheets—Sheet 1.
J. NOXON.
SEEDING MACHINE.

No. 451,067.　　　　　　　　　　Patented Apr. 28, 1891.

Witnesses　　　　　　　　　　　　　　　Inventor

O. Edw. Maybee　　　　　　　　　　　James Noxon
H. G. McMillan　　　　　　　　　　　Donald C. Ridout &c.
　　　　　　　　　　　　　　　　　　　Attys.

(No Model.)                    J. NOXON.                    2 Sheets—Sheet 2.
                          SEEDING MACHINE.
No. 451,067.                                Patented Apr. 28, 1891.

Witnesses                                      Inventor
J. Edw. Maybee                                 James Noxon
H. G. McMillan                                 by Donald C. Ridout & Co.
                                                        attys.

UNITED STATES PATENT OFFICE.

JAMES NOXON, OF WOODSTOCK, CANADA.

SEEDING-MACHINE.

SPECIFICATION forming part of Letters Patent No. 451,067, dated April 28, 1891.

Application filed September 6, 1890. Serial No. 364,110. (No model.)

*To all whom it may concern:*

Be it known that I, JAMES NOXON, manufacturer, of the town of Woodstock, in the county of Oxford, in the Province of Ontario, Canada, have invented a certain new and useful Improvement in Seeding-Machines, of which the following is a specification.

The object of the invention is to improve and simplify the construction of that portion of a seeding-machine connected with the angling and zigzagging of the hoes or teeth; and it consists in the arrangement and construction of parts, as hereinafter more particularly explained, and then definitely claimed.

Figure 1:
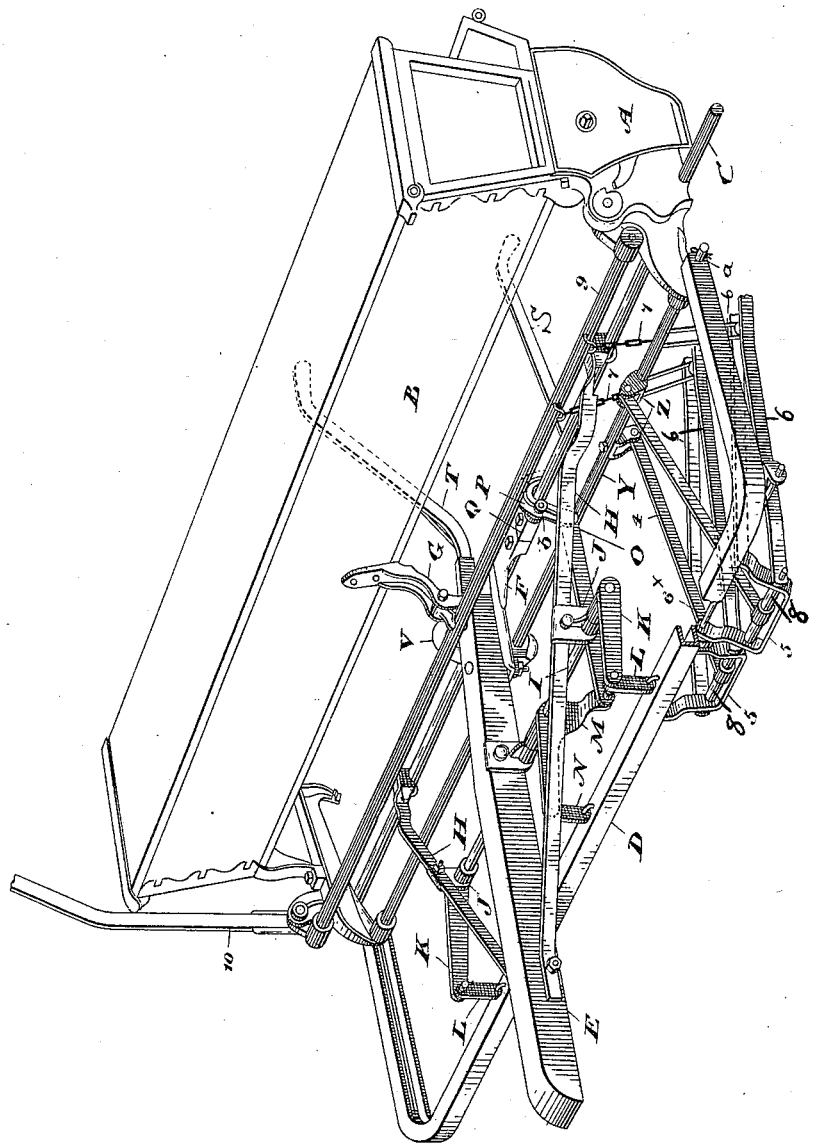
Figure 2:
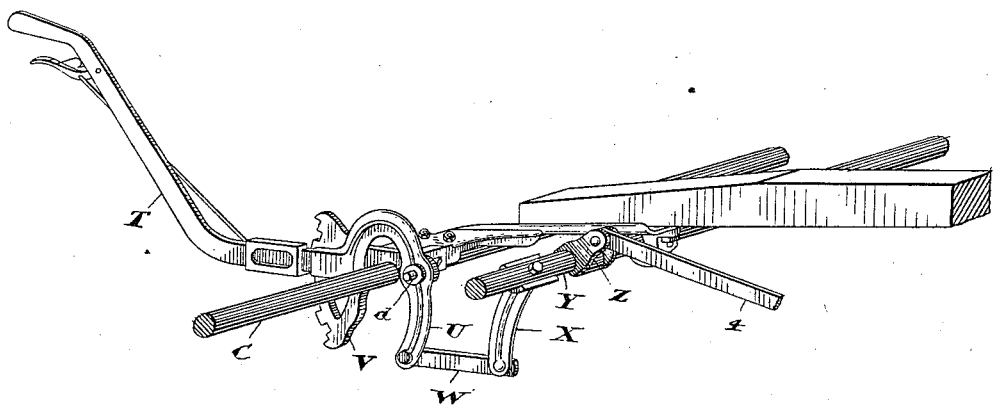
Figure 3:
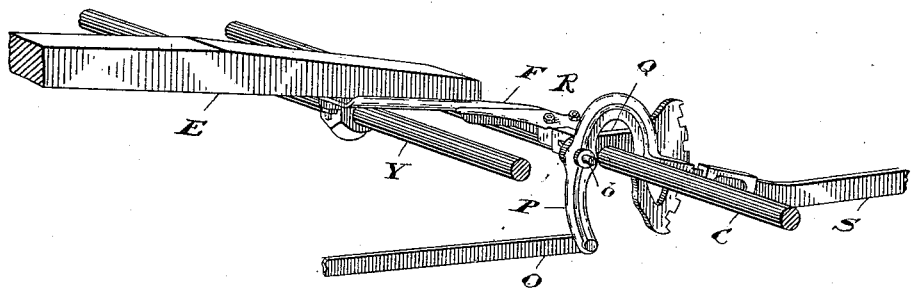

Figure 1 is a perspective view of that portion of a seeding-machine to which my invention relates. Fig. 2 is a perspective view of the lever and its connections by which the zigzagging of the hoes or teeth is effected. Fig. 3 is a perspective detail of the lever and its connection by which the angling of the hoes or teeth is effected.

In the drawings, A represents a stationary frame, on which the seeding-box B is fixed and the main axle C is supported.

D is a light metal frame, preferably made of steel and pivoted at $a$ on the frame A.

E is a tongue secured by the bracket F to the axle C and to the seeding-box B by the bracket G. The diagonal braces H extend from the axle C to the tongue, as indicated.

I is a rock-shaft suitably journaled in the boxes J, which are supported respectively by the diagonal braces H and tongue E, as indicated. On each end of the rock-shaft I, I fix the arms K, which are connected by the links L to the frame D, as shown.

M is a T-crank journaled on the rock-shaft I and connected at one end to the frame D by the link N and at its other end to a rod O, which at its other end is connected to the horn P, pivoted at $b$ on the quadrant-bracket Q, which is fixed to or forms part of the bracket R, connected to the tongue E, as indicated in Fig. 3.

The handle S, fixed to the horn P, extends behind the seeding-box B to a point convenient to the man walking in rear of the machine. A handle T, which, like the handle S, extends behind the seeding-box B, is fixed to a horn U, which is pivoted at $d$ to the stationary quadrant V. The horn U is connected by the link W to the lever X, which is fixed to the shaft Y, suitably journaled in the frame A, as indicated. A series of short arms Z are fixed to the shaft Y and project alternately above and below the said shaft. Each arm Z is connected by a bar 4, crossbar 8, to a loop 5, pivoted on the rod $6^x$, which is suitably supported by the frame D. Each pair of drag-bars 6 is connected to an independent loop 5. Owing to the connection between the lever T and the shaft Y, as already described, the movement of the lever T causes the said shaft Y to roll in its journals, and owing to the connection between the short arm Z and the loops 5 the rolling of the shaft Y throws one set of the loops 5 forward and simultaneously draws the other set of loops backward, and as each pair of drag-bars 6 and the hoes connected to them are thus zigzagged, one set being thrown forward while the other set is simultaneously thrown backward, and as all the loops 5 are the same length and move the same distance, all the hoes or teeth are set at the same angle. The fact that all the hoes or teeth correspond with each other in the angle at which they are set is a very important feature in my invention, as the connection of all the teeth or hoes on the ground will correspond.

Each pair of drag-bars 6 is connected by the chain 7 to the roller 9, journaled in the front of the frame A, as indicated in Fig. 1. The roller 9 is provided with a lever 10, by the movement of which the roller 9 is caused to revolve, and thus raise the teeth or hoes as required.

Owing to the connection already described between the handle S and the rock-shaft I, the movement of the said lever causes the rock-shaft I to roll in its journals, and as this rock-shaft I is connected, as already described, to the frame D the movement of the lever S raises or lowers the frame D, according to the direction in which the said handle S is moved.

What I claim as my invention is—

1. The pivoted frame D and the loops 5, swinging independently on said frame, to which the drag-bars 6 are connected, in combination with the rock-shaft I, connected to the frame D and operated by the handle S through intermediate connections, substantially as and for the purpose specified.

2. The tongue E, braced by the diagonal braces H, the journal-boxes J for the rock-shaft I, the arms K, and links L, connecting the rock-shaft I to the frame D, in combination with the T-crank M, fixed to the rock-shaft I and connected to the handle S by the rod O, and lever P, substantially as and for the purpose specified.

3. A series of independently-pivoted loops 5, projecting below the frame D, each loop supporting an independent drag-bar, in combination with mechanism arranged to rock the said loops in such a manner as to zigzag the hoes or teeth connected to the drag-bars, substantially as and for the purpose specified.

4. A series of independently-pivoted loops 5, each loop having a pair of drag-bars 6 attached to it and each loop independently connected by a bar 4 to a short arm Z on the shaft Y, the said arms projecting alternately from opposite sides of the said shaft, in combination with the handle T, arranged to roll the shaft Y, substantially as and for the purpose specified.

Woodstock, June 13, 1890.

JAMES NOXON.

In presence of—
HARRY J. WATSON,
D. C. PAGE.